United States Patent
Raghuvanshi et al.

(10) Patent No.: US 9,432,790 B2
(45) Date of Patent: Aug. 30, 2016

(54) REAL-TIME SOUND PROPAGATION FOR DYNAMIC SOURCES

(75) Inventors: Nikunj Raghuvanshi, Durham, NC (US); John Michael Snyder, Redmond, WA (US); Ming Chieh Lin, Chapel Hill, NC (US); Naga K. Govindaraju, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 862 days.

(21) Appl. No.: 12/573,157

(22) Filed: Oct. 5, 2009

(65) Prior Publication Data

US 2011/0081023 A1    Apr. 7, 2011

(51) Int. Cl.
*H04R 5/00* (2006.01)
*H04S 7/00* (2006.01)
*A63F 13/54* (2014.01)
*H04M 3/56* (2006.01)

(52) U.S. Cl.
CPC .............. *H04S 7/30* (2013.01); *A63F 13/54* (2014.09); *A63F 2300/6081* (2013.01); *G10H 2250/531* (2013.01); *H04M 3/56* (2013.01); *H04S 7/302* (2013.01); *H04S 7/305* (2013.01); *H04S 2400/11* (2013.01)

(58) Field of Classification Search
CPC ............. H04S 7/302; H04S 2400/11; G10H 2250/53; A63F 13/54; A63F 2300/60811
USPC ...... 381/1, 17, 58, 61, 63, 303, 310; 463/30, 463/32, 33, 35; 700/94; 84/DIG. 26; 703/3, 703/6

See application file for complete search history.

(56) References Cited

U.S. PATENT DOCUMENTS

| | | | |
|---|---|---|---|
| 7,146,296 B1* | 12/2006 | Carlbom et al. | 703/5 |
| 7,606,375 B2* | 10/2009 | Bailey et al. | 381/63 |
| 2005/0058297 A1 | 3/2005 | Jot et al. | |
| 2007/0294061 A1 | 12/2007 | Carlbom et al. | |
| 2008/0069364 A1* | 3/2008 | Itou et al. | 381/17 |
| 2008/0137875 A1 | 6/2008 | Zong et al. | |
| 2008/0273708 A1 | 11/2008 | Sandgren et al. | |

OTHER PUBLICATIONS

Funkhouser, et al. "Survey of Methods for Modeling Sound Propagation in Interactive Virtual Environment Systems", Retrieved at >>http://www-sop.inria.fr/reves/Nicolas.Tsingos/publis/presence03.pdf>>, 2003, pp. 1-53.

(Continued)

*Primary Examiner* — Duc Nguyen
*Assistant Examiner* — Kile Blair
(74) *Attorney, Agent, or Firm* — Alin Corie; Sandy Swain; Micky Minhas

(57) ABSTRACT

Described herein are techniques pertaining to real-time propagation of an arbitrary audio signal in a fixed virtual environment with dynamic audio sources and receivers. A wave-based numerical simulator is configured to compute response signals in the virtual environment with respect to a sample signal at various source and receiver locations. The response signals are compressed and placed in the frequency domain to generate frequency responses. Such frequency responses are selectively convolved with the arbitrary audio signal to allow real-time propagation with moving sources and receivers in the virtual environment.

19 Claims, 11 Drawing Sheets

(56) References Cited

OTHER PUBLICATIONS

Astheimer, Peter, "What You See is What You Hear—Acoustics Applied in Virtual Worlds", Retrieved at >>http://ieeexplore.ieee.org/stamp/stamp.jsp?arnumber=00378256>>, 1993, pp. 100-107.

Wand, et al., "A Real-Time Sound Rendering Algorithm for Complex Scenes", Retrieved at >>http://www.mpi-inf.mpg.de/~mwand/papers/tr03.pdf>>, Jul. 2003, pp. 1-13.

Lauterbach, et al., "Interactive Sound Rendering in Complex and Dynamic Scenes Using Frustum Tracing", Retrieved at >>http://ieeexplore.ieee.org/stamp/stamp.jsp?arnumber=04376201>>, Nov./Dec. 2007, vol. 13, No. 6, pp. 1672-1679.

Lentz, et al., "Virtual Reality System with Integrated Sound Field Simulation and Reproduction", Retrieved at >>http://www.hindawi.com/journals/asp/2007/070540.pdf>>, 2007, Article ID 70540, pp. 1-22.

\* cited by examiner

REAL-TIME SOUND PROPAGATION FOR DYNAMIC SOURCES

BACKGROUND

Video gaming technologies have advanced in recent years to allow a game player to have a rich experience when playing a video game. In the recent past, video game environments were limited to two dimensions. In other words, a video game player could control one or more graphical characters on a video screen in two dimensions (e.g., left and right; up and down). This limitation to a two-dimensional environment due to limitations in processors associated with gaming consoles. Specifically, the processors were unable to render and update graphical scenes in three dimensions responsive to user input.

These older video games also output audio signals when certain circumstances occurred in the game. For example, when a player caused a character to jump a particular audible output would be generated that indicated to the player that the jump had occurred. These output sounds were identical regardless of where in the two-dimensional environment the character was undertaking the particular action.

In currently available game systems with respect to certain games, a player can cause a character to navigate through a virtual three-dimensional environment. Additionally, such games can output sounds that depend upon the perspective of the user in the game with respect to the three-dimensional environment. For example, in a "first-person" game, a game developer can cause sounds to be output that sound to the player as if the noise came from a certain position in the three-dimensional environment while the player is positioned at a certain location in the three-dimensional environment. Game developers have traditionally undertaken this output of sound by, for instance, coding different sounds depending on where in the three-dimensional environment the player is desired to reside. Programming so many different sounds for a variety of possible noises can take an incredible amount of time and effort by the game developer.

SUMMARY

The following is a brief summary of subject matter that is described in greater detail herein. This summary is not intended to be limiting as to the scope of the claims.

Described herein are various technologies pertaining to playing back an arbitrary audio signal such that it is perceived by a listener to have been generated at a particular location in a virtual three-dimensional environment and received at a different particular location in the virtual three-dimensional environment. In other words, various technologies pertaining to undertaking real-time acoustic modification that supports dynamic sources and listeners in a particular virtual three-dimensional environment are described herein. Such real-time modification of an arbitrary audio signal can be accomplished through utilization of a numerical simulator that can simulate a sample audio signal from a plurality of source locations and received at a plurality of receiver locations in a static virtual three-dimensional environment. In an example, a sample audio signal may be a pulse, and the numerical simulator may be configured to ascertain impulse responses at various receiver locations for a plurality of different source locations.

Pursuant to an example, a virtual three-dimensional environment can be created. For instance, this environment may be a room or series of rooms, or an outdoor scene with particular boundaries, generated by a game developer. In another example, a virtual three-dimensional environment may be a representation of a room in a house (e.g., generated by a CAD program or automatically generated through utilization of sensors). Various features pertaining to the three-dimensional environment may also be included in such three-dimensional environment, including but not limited to, type of materials that make up walls in the three-dimensional environment, types of materials that make up furniture in the three-dimensional environment (e.g., absorption data), or other suitable data. The three-dimensional environment may be partitioned into a volumetric grid. A numerical simulator may then be configured to simulate output of a sample audio signal from a particular source location (e.g., from a particular cell in the volumetric grid). The numerical simulator may be configured to ascertain an impulse response at a plurality of receiver locations in the volumetric grid, given that the sample audio signal is output from the particular source location. For example, the numerical simulator can determine an impulse response from receivers placed in each cell of the volumetric grid, or from a subsampled set of cells in the volumetric grid. These impulse responses may be subject to sub-sampling, compression (factoring) such that a resulting data file can be utilized in connection with real-time modification of an arbitrary audio signal given dynamic sources and receivers. This process can be repeated for a plurality of different source locations in the three-dimensional environment, such that the data file can comprise compressed responses pertaining to the sampled audio signal at different source and receiver locations.

Example data that can be included in the aforementioned data file for a particular source and receiver location in the virtual three-dimensional environment can include data representative of a late reverberation phase of a response (e.g., peaks detected during the late reverberation phase, wherein the peaks are indicative of frequency and amplitude of the response signal), data indicative of an early reflection phase of the response signal (e.g., peaks detected with respect to time in the early reflection phase of the response signal), and a frequency trend computed based at least in part upon the detected frequencies in the early reflection phase of the response signal. In an example, the early reflection phases of response signals can be computed more spatially densely when compared with the late reverberation portion of response signals. For instance, the late reverberation phase can be computed a single time and utilized for each source/receiver location pair, while early reflection phases of response signals can be computed independently for each source/receiver location pair.

Once this data file has been generated, such data file can be used in connection with modifying arbitrary audio signal in real time for dynamic sources and/or receivers in the virtual three-dimensional environment. For example, a desired location of a source of the arbitrary audio signal can be identified in the virtual three-dimensional environment, and a desired location of a receiver of the arbitrary audio signal can be identified in the virtual three-dimensional environment. The precomputed data file can be accessed, and an interpolation can be undertaken using data pertaining to simulated source locations and receiver locations. Once the interpolation has been undertaken, the resulting interpolated data can be convolved in real time with the arbitrary audio signal. The result of the convolution can be a modified signal that is perceived by a listener as if it was output at the source location and the listener is at the receiver location.

Other aspects will be appreciated upon reading and understanding the attached figures and description.

DETAILED DESCRIPTION

Figure 1:
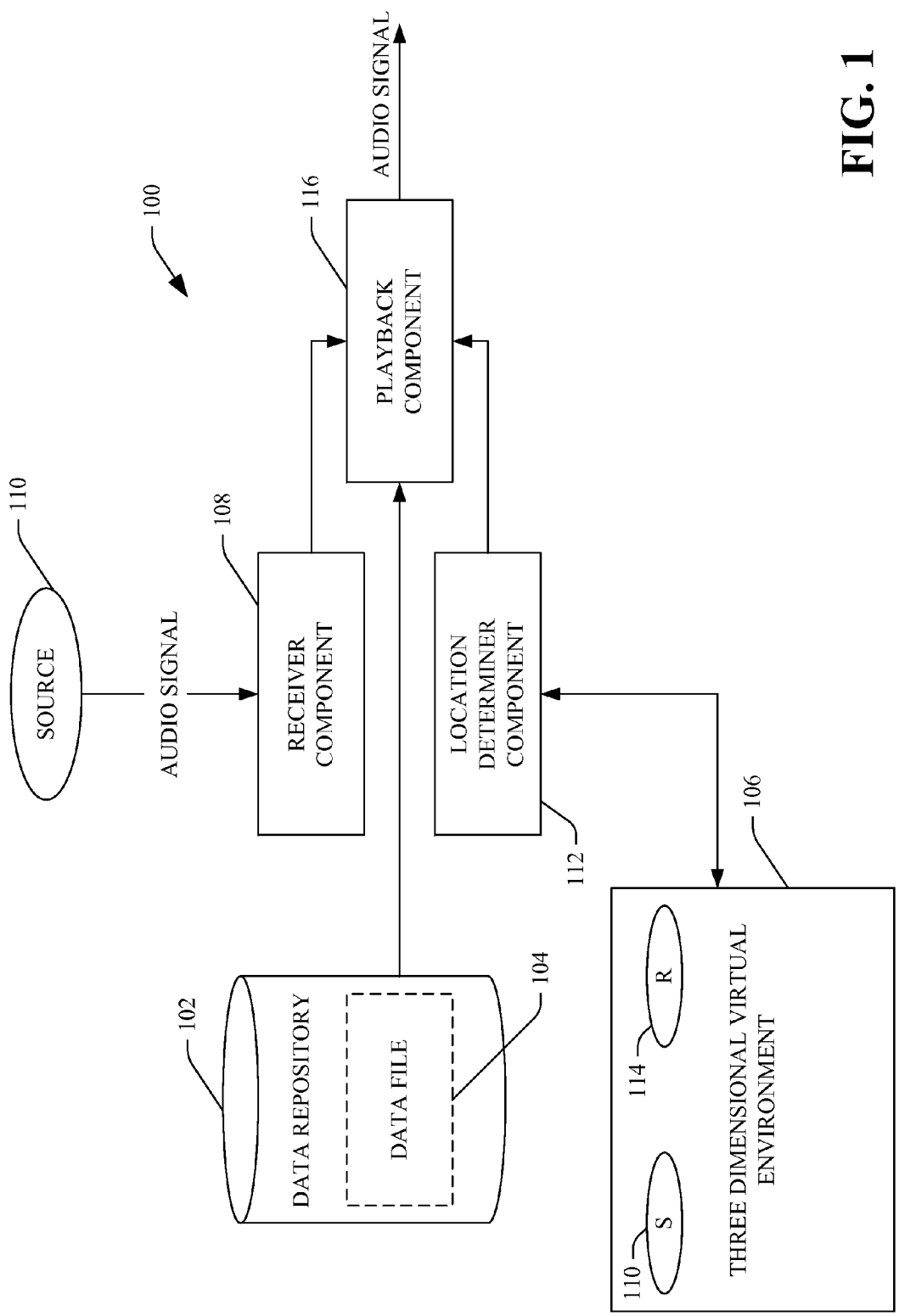
FIG. 1 is a functional block diagram of an example system that facilitates automatically and in real time propagating audio signals for dynamic sources and/or receivers in a virtual three-dimensional environment.

Various technologies pertaining to real-time audio propagation for dynamic sources and/or receivers in a static virtual three-dimensional environment will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates real-time audio propagation for dynamic sources and/or receivers in a virtual three-dimensional environment is illustrated. The system 100 comprises a data repository 102 that includes a (pre-computed) data file 104. The data file 104 comprises data that is based at least in part upon a pre-computed, offline, wave-based simulation for a static virtual three-dimensional environment 106. The wave-based simulation can be computed in terms of the seven-dimensional spatially varying acoustic response pertaining to the virtual three-dimensional environment 106; $S(t, p_s, p_r)$ where t is time, $p_s$ is source location in the virtual three-dimensional environment 106, and $p_r$ is receiver location in the virtual three-dimensional environment 106. More detail pertaining to an example manner for generating the data file 104 will be provided below. For purposes of explanation of FIG. 1, what is to be understood is that the data file 104 is precomputed and comprises data pertaining to a simulation of a sample audio signal originating in the virtual three-dimensional environment 106 from a plurality of different source locations to a receiver in a plurality of different receiver locations.

The system 100 additionally includes a receiver component 108 that can receive an arbitrary audio signal from a source 110. The source 110 may be a footstep, a mouth of an individual or a virtual individual in the virtual three-dimensional environment 106, a breaking vase in the virtual three-dimensional environment 106, or any other suitable arbitrary audible signal that is intended to originate from the source 110 in the virtual three-dimensional environment 106.

A location determiner component 112 can determine a first location and a second location in the virtual three-dimensional environment 106. The first location can be a location of the source 110 in the virtual three-dimensional environment 106, and the second location can be a location of a receiver 114 in the virtual three-dimensional environment 106. For example, as will be described in greater detail below, the virtual three-dimensional environment 106 can be partitioned into a volumetric grid, and the location determiner component 112 can determine that the source 110 is within a particular cell within the volumetric grid and the receiver 114 is in another cell in the volumetric grid. For instance, the virtual three-dimensional environment 106 can pertain to a three-dimensional environment in a video game. The video game may be a first-person game such that a player of the video game perceives herself to be at a location in the virtual three-dimensional environment 106 that corresponds to the receiver 114. The source 110 may be a character taking a footstep in the virtual three-dimensional environment 106 at a particular location in the virtual three-dimensional environment 106. Thus, the source 110 may be a foot hitting the ground in the virtual three-dimensional environment 106, and the audio signal may be representative of the sound that is output at the source location when such foot hits the ground. The location determiner component 112 can determine location of the source 110 in the virtual three-dimensional environment 106, and can also determine location of the receiver 114 in the virtual three-dimensional environment 106.

A playback component 116 can access the data file 104 responsive to the receiver component 108 receiving the audio signal (e.g., intended to originate from the source 110) and the location determiner component 112 determining the location of the source 110 and the location of the receiver 114 in the virtual three-dimensional environment 106. The playback component 116 can access the data repository based at least in part upon the first location (the location of the source 110 in the virtual three-dimensional environment 106) and the second location (the location of the receiver 114 in the virtual three-dimensional environment 106). The playback component 116 can automatically cause the audio received from the source 110 to be modified such that it is perceived by a listener as being initiated from the first location (the location of the source 110) when the listener is at the second location (the location of the receiver 114).

Continuing with the video game example, the sound caused by the foot hitting the floor in the virtual three-dimensional environment 106 will be perceived by the listener (the game player) to have been generated at the location of the source 110 in the virtual three-dimensional environment 106 when the game player (the listener) is placed at the location of the receiver 114 in the virtual three-dimensional environment 106. Therefore, if the video game is a first-person game, the listener will be at the location of the receiver 114 in the virtual three-dimensional environment 106, and the audio signal when output by the playback component 116 will sound as if it were emitted from the location of the source 110 in the virtual three-dimensional environment 106 when the listener is at the location of the receiver 114 in such virtual three-dimensional environment 106.

Moreover, as the source 110 and/or the receiver 114 change position in the virtual three-dimensional environment 106, the playback component 116 can be configured to modify the audio signal in real-time as such positions change. For instance, if the source 110 is a person talking that is moving closer to the receiver, the playback component 116 can cause the volume of the audio signal to increase as it becomes closer to the receiver 114.

While the system 100 has been described in the example of video games (such that the system can be included in a gaming console), the system 100 may be used in a variety of other applications. For example, the system 100 may be used in connection with a virtual sound studio or karaoke machine. In such an example, the source 110 may be a person that is outputting the audio signal, and such person may desire that the audio sound as if it were being output from a particular location in a certain cathedral. The virtual three-dimensional environment 106 can be representative of the cathedral. The person may then configure the system 100 to cause the audio to sound as if the person is walking down the stairs of the cathedral while a listener is sitting at a certain pew in the cathedral. Another example application of the system 100 may be determining an optimal position of speakers in a stereo system, or a manner in which to output audio that sounds optimal for different listener locations. For instance, the virtual three-dimensional environment 106 can represent a room and a source of sound can be a speaker in such room. A sensor can be coupled to the listener to ascertain location of a listener in the room (e.g., a sensor in a person's watch, etc.) As the listener moves about the room, the location determiner component 112 can update the respective location of the listener in the virtual three-dimensional environment 106, and the playback component 116 can automatically modify audio to be transmitted from the speakers such that the audio will have optimal sound quality as perceived by the listener.

In still yet another example application, the system 100 may be utilized in connection with a telephone conferencing system. The three dimensional virtual environment 106 can represent a room in which a telephone is positioned, and the location of such telephone can be the location of the source 110 in the virtual three-dimensional environment 106. Again, the listener can have a sensor corresponding thereto that indicates position in the room of the listener (and thus position of the receiver 114 in the virtual three-dimensional environment 106). The playback component 116 can automatically modify audio to be transmitted from the telephone to cause the audio to be perceived by the listener as being clear as the listener moves about the room. Still further, the system 100 may be employed in a mobile computing device, a personal computer, or other suitable computing device. Other applications will be contemplated and are intended to fall under the scope of the hereto-appended claims.

Moreover, in an example, the system 100 can be configured to automatically modify sounds from sources in adjacent virtual three-dimensional environments. For example, the virtual three-dimensional environment 106 may be a room, and the pre-computed data file 104 may pertain to such room. A separate three-dimensional data file can be computed for an adjacent room (a different virtual three-dimensional environment). To propagate an audio file from the adjacent room, the audio file can be modified as it would sound to a receiver at an exit point of the adjacent room (and an entry point of the virtual three-dimensional environment 106). Such modified audio signal can then be treated as the arbitrary audio signal being emitted from the entry point of the virtual three-dimensional environment 106 (the exit point from the adjacent room). The pre-computed data file 104 can be accessed by the playback component 116, which can propagate the audio signal as if the source were at the aforementioned entry point and the receiver were at a determined receiver location.

Figure 2:
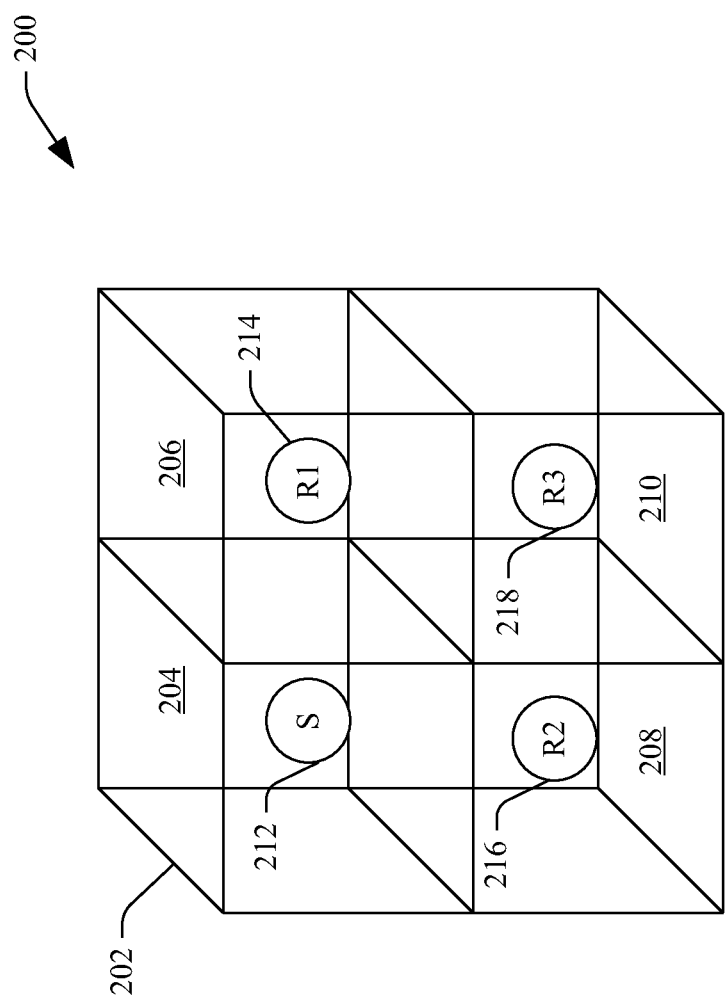
FIG. 2 is an example depiction of a three-dimensional environment partitioned into a volumetric grid.

Referring now to FIG. 2, an example depiction 200 of a virtual three-dimensional environment 202 is illustrated. The virtual three-dimensional environment 202 can be partitioned into a plurality of cells 204-210. In an example, the virtual three-dimensional environment 202 may be representative of a certain room in a building, and various aspects pertaining to the virtual three-dimensional environment 202 may be specified by a designer of such environment 202. For instance, type of materials used for walls can be specified, thickness of walls can be specified, location and type of furniture can be specified, materials included in the furniture can be specified, amongst other suitable data pertaining to audio absorption/reflection. Furthermore, while the virtual three-dimensional environment 202 is shown as being cubical in nature, it is to be understood that the virtual three-dimensional environment may be or include any suitable shape. Moreover, while the virtual three-dimensional environment 202 is shown as being partitioned into four cells, it is to be understood that a virtual three-dimensional environment may be partitioned into any suitable number of cells, and the cells may be equivalently sized and shaped or of different sizes and shapes.

As indicated above, a wave-based numerical simulation (a numerical simulation that is based at least in part upon the Linear Acoustic Wave Equation) can be undertaken with respect to a plurality of source locations and a plurality of receiver locations in a virtual three-dimensional environment. In the example depicted in FIG. 2, a source 212 of a sample audio signal can be located in the first cell 204. During execution of the numerical simulation, response signals can be computed at receivers 214-218 in other cells of the virtual three-dimensional environment 202 (as well as at the source location). For instance, response signals can be generated at receiver locations in each cell of the virtual three-dimensional environment or from a subset of cells in the virtual three-dimensional environment. Pursuant to an example, the numerical simulation may be configured to simulate the source 212 outputting a sample signal from the first cell 204 to receivers in the first cell 204, second cell 206, the third cell 208, and the fourth cell 210, respectively. Accordingly, response signals pertaining to the sample audio signal simulated as being output by the source 212 can be generated for receiver locations at each of the cells 204, 206, 208 and 210. Thereafter, such receiver locations can be sampled, for instance, to reduce an amount of storage space utilized in connection with storing the data file 104 (FIG. 1). In another example, such sampling of cells can be undertaken prior to the simulation of the source 212 being configured to output the sample audio signal.

The virtual three-dimensional environment 202 may be generated through any suitable mechanism. For instance, the virtual three-dimensional environment 202 may be generated by a game developer in connection with designing a video game. In another example, the virtual three-dimensional environment 202 can be automatically generated through utilization of sensors that sense location of objects in a room (e.g., sonar sensors or other suitable sensors). In still yet another example, the virtual three-dimensional environment 202 can be created based at least in part upon one or more images of a static scene.

Figure 3:
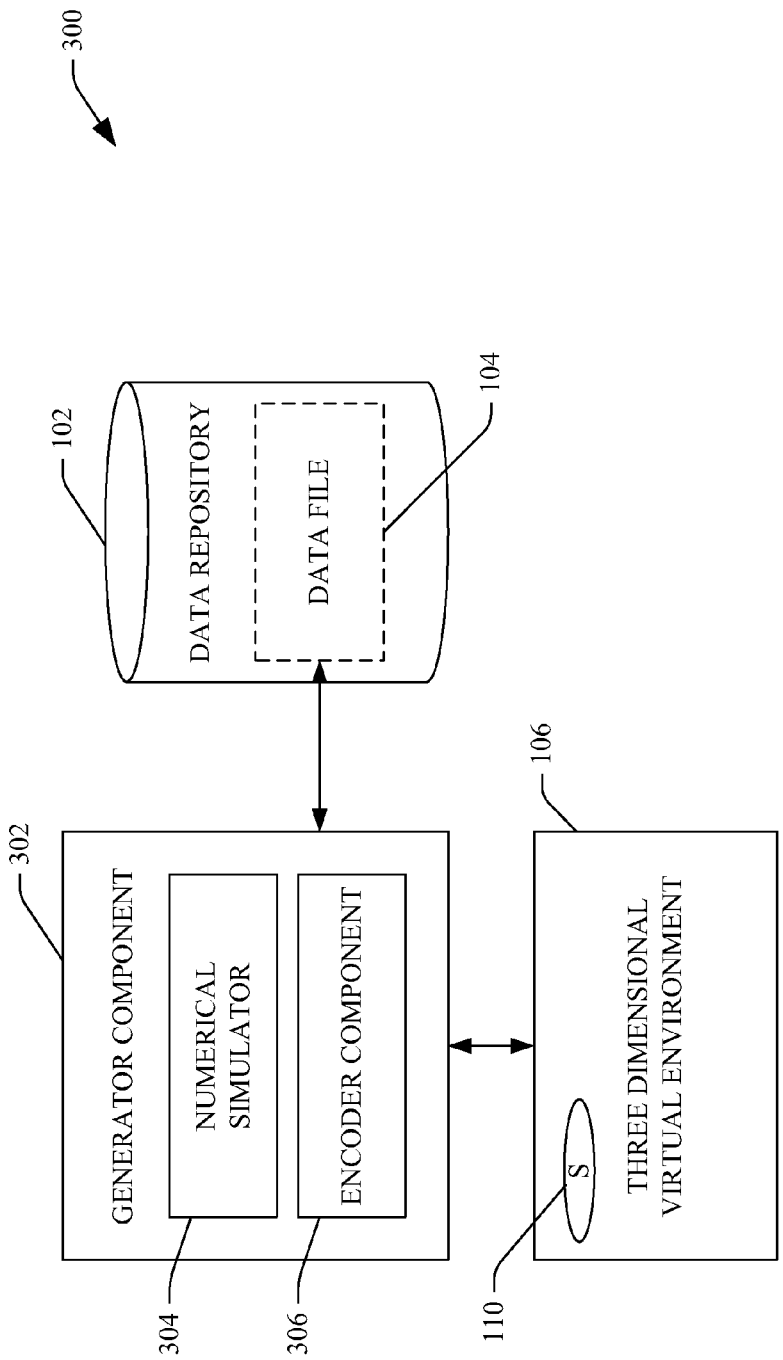
FIG. 3 is a functional block diagram of an example system that facilitates generating a precomputed data file used in connection with real-time audio propagation for dynamic sources and receivers.

Referring now to FIG. 3, an example system 300 that facilitates pre-computing a data file (e.g., the data file 104) that can be used in connection with propagating audio in real time with dynamic sources/receivers is illustrated. The system 300 includes a generator component 302 that is configured to generate the data file 104 that is retained in the data repository 102. The generator component 302 comprises a numerical simulator 304, which can be an acoustic simulator that utilizes the wave equation to simulate response signals at various receiver locations with respect to a sample signal output from one or more source locations in the virtual three-dimensional environment 106. The numerical simulator 304 receives a plurality of data pertaining to the virtual three-dimensional environment 106, including but not limited to geometry of the virtual three-dimensional environment 106, absorption parameters pertaining to the virtual three-dimensional environment 106, grid resolution of the virtual three-dimensional environment 106 (cell distribution), a sample signal desirably output by the source 110, and a desired location of the source 110 in the virtual three-dimensional environment 106. Additionally, constraints on frequencies simulated by the numerical simulator 304 can be received.

The numerical simulator 304 can be configured to execute a first numerical simulation with a sample audio signal when the source 110 is positioned at approximately a center of the virtual three-dimensional environment 106. This simulation can be referred to herein as an "oracle" simulation. Results of the oracle simulation executed by the numerical simulator 304 can be utilized in connection with selecting source locations of subsequent simulations executed by the numerical simulator 304 and determining a split between an early reflection phase of a response signal and a late reverberation phase of a response signal. As will be described in greater detail below, the late reverberation phase of a response signal in the oracle simulation can be retained and utilized as the late reverberation phase of every response signal for every simulation undertaken with respect to the virtual three-dimensional environment 106. For instance, the human ear cannot perceive a great difference between late reverberation phases of an audio signal emitted from different source locations in a same room. Therefore, a single late reverberation phase determined in the oracle simulation can be utilized as an estimate for late reverberation phases of simulated response signals for different source and receiver locations in a virtual three-dimensional environment. This can effectively reduce computation time utilized to generate the data file 104 (FIG. 1) as well as memory utilization at runtime. It is to be understood, however, that late reverberation phases can be computed for various source locations and/or various receiver locations if desired (e.g., if time needed to generate the data file 104 is not a concern).

As indicated above, the oracle simulation can be utilized to determine a plurality of source locations for subsequent simulations. Such source locations, in an example, can be chosen based on k-means clustering of early decay time derived from the initial simulation undertaken by the numerical simulator 304. Early decay time is a standard room acoustic metric that quantifies how fast sound decays when emitted from different room locations. In another example, a uniform sampling of cells in the virtual three-dimensional environment 106 at a suitable down-sampled resolution relative to the simulation grid can be undertaken to determine the plurality of source locations for subsequent simulations. The oracle simulation can also be employed to determine a time duration of a response signal that needs to be simulated at the various source locations. Pursuant to an example, the oracle simulation can be utilized of to capture an entirety of the acoustic response in the virtual three-dimensional environment 106 at various receiver locations in the virtual three-dimensional environment 106 (e.g., at each cell). Pursuant to an example, an input signal provided to the numerical simulator 304 can be a pulse, such as a Gaussian derivative pulse of unit amplitude given by the following equation:

$$s(t) = \frac{\sqrt{e}}{\sigma}(t - 5\sigma)\exp\left(-\frac{(t-5\sigma)^2}{\sigma^2}\right),$$

where $$\sigma = \frac{1}{2\pi v},$$

and where v=500. The Fourier transform of this function is a Gaussian with center at 500 Hz and width spanning an entire frequency range from 0 to 1 kHz, for example.

In another example, the simulation grid can have a resolution of approximately 12 centimeters (e.g., the virtual three-dimensional environment 106 can be partitioned into twelve centimeter cubes). Since humans do not perceive sound variation at such high spatial resolution, simulation results can be down-sampled by a factor of 2 to 3, to reduce runtime memory and computational requirements. As indicated above, only an early reflection phase of a response signal at a receiver location need be retained, as the late reverberation phase can be estimated for all response signals using the oracle simulation (as will be described in greater detail herein).

In an example, the numerical simulator 304 can cause a response of the virtual three-dimensional environment 106 to be retained as a band-limited Gaussian derivative (rather than a true impulse response). This Gaussian derivative can be converted to an impulse response by way of a simple computation. In the following examples, all functions are discrete vectors of samples in time or frequency, but continuum notation is utilized for the sake of brevity. If an actual response at a receiver at a particular cell can be given by a function l(t) and a corresponding ideal impulse response by I(t) using ⊗ to denote convolution, · to denote element-wise multiplication, and $\hat{x}$ to denote the Fourier transform of x, the following can be obtained:

$$l(t)=s(t)\otimes I(t) \Leftrightarrow \hat{l}(f)=\hat{s}(f)\cdot\hat{I}(f)$$

To solve for the impulse response, deconvolution can be undertaken using a frequency coefficient division to obtain the Fourier transform of the impulse response, called the Frequency Response (FR).

$$\hat{I}(f) = \frac{\hat{i}(f)}{\hat{s}(f)}.$$

Naively, an inverse Fast Fourier Transform (FFT) on the frequency response Î(f) can yield I(t). Before performing the inverse FFT, a low pass filter can be executed over the frequency response to eliminate frequencies above a particular threshold (e.g., 1 kHz), since such frequencies may be outside a range of the numerical simulator 304 and thus may include numerical errors. In an example, a frequency response vector can be zero padded in all frequency bins above the threshold frequency (e.g., up to a target rate of a certain frequency). In another example, the frequency response can be windowed, which involves attenuating frequencies well before reaching the aforementioned threshold frequency. This can reduce ringing artifacts in the time domain. The impulse response for each receiver location in the virtual three-dimensional environment 106 can be obtained by performing an inverse FFT on the windowed frequency response. Pursuant to an example, the following window function chosen from the so-called $\cos^a(x)$ class can be utilized:

$$w(n) = \sum_{k=0}^{3} (-1)^k a_k \cos \frac{2\pi k n}{N}, n \in [0, N-1]$$

$$a = [0.355768, 0.487396, 0.144232, 0.012604],$$

where N is a number of frequency bins from zero to the threshold frequency (e.g., 1 kHz). Frequency values outside such range may already be zero, as discussed above. While the above window function has been given as an example, it is to be understood that any suitable window function can be employed. For instance, a simple rectangular window function can be utilized.

The generator component 302 may further include an encoder component 306 that can be employed to compress/factor response signals obtained via numerical simulation undertaken by the numerical simulator 304. Additional detail pertaining to the compression and factoring of response signals is described in greater detail below. The compressed response signals can be stored in the data file 104, which can be utilized in connection with propagating audio with dynamic sources and/or receivers.

Figure 4:
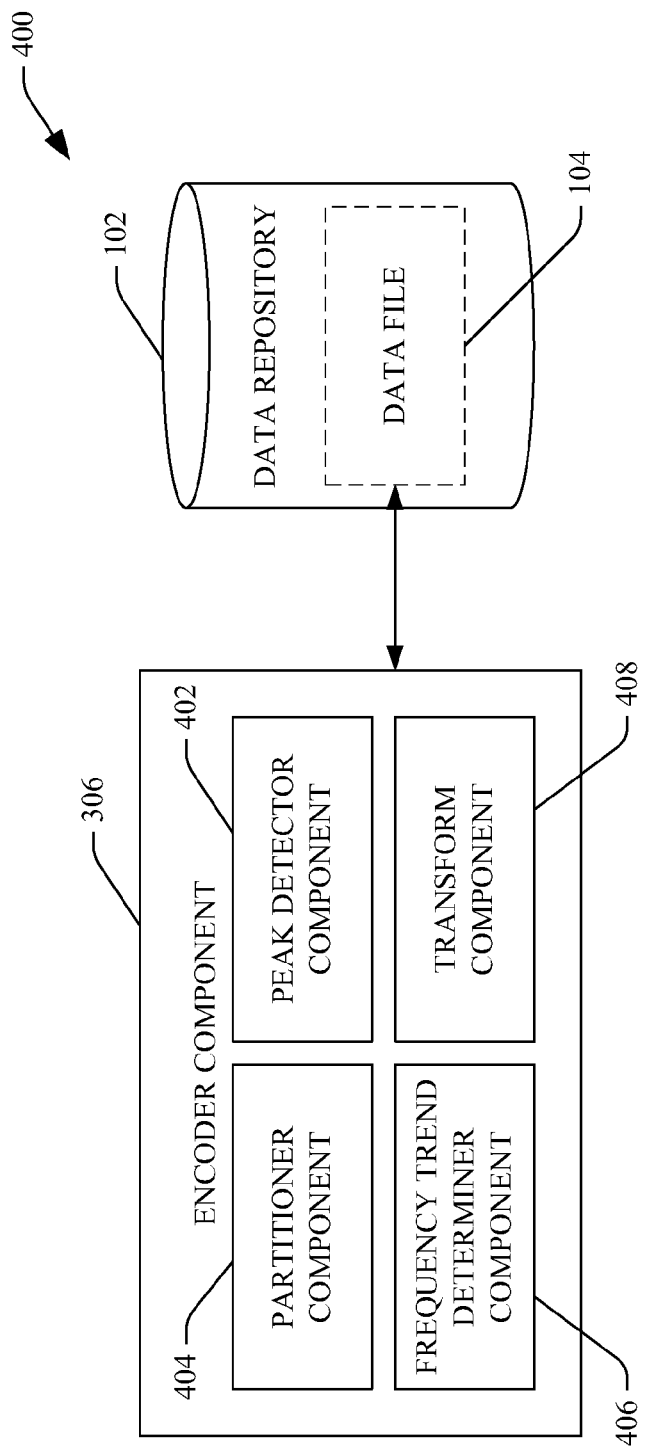
FIG. 4 is a functional block diagram of an example system that facilitates generating the precomputed data file.

Now referring to FIG. 4, an example depiction of the encoder component 306 is illustrated. The encoder component 306 is configured to ascertain the length of the early reflection phase of the impulse response for the oracle simulation and a length of the late reverberation phase of the impulse response with respect to the oracle simulation undertaken by the numerical simulator 304. For instance, the oracle simulation can be undertaken to generate an initial response signal when the source is located at the centroid of the virtual three-dimensional environment and the receiver is also located at the centroid of the virtual three-dimensional environment. A peak detector component 402 is configured to detect peaks in the initial response signal. The peak detector component 402 searches for local maxima at each sample by testing against its two neighboring samples in time. If a sample in consideration is indeed a local maximum, the peak detector component 402 registers a peak at the current sample number with amplitude equaling the amplitude of the response signal at such point. With respect to the oracle simulation, the peak detector component 402 can register a relatively high number of highest amplitude peaks, such as between one hundred and two hundred peaks with highest amplitude amongst all detected peaks in the response signal.

A partitioner component 404 can be configured to determine a length of the early reflection phase in the response signal and, thus, an onset of the late reverberation phase in the response signal. The peaks extracted by the peak detector component 402 can be utilized by the partitioner component 404 to infer the RT60 of the virtual three-dimensional environment 106, which is representative of a reverberation time, which is the time it takes for a sound field to decay by 60 decibels from the initial level of the sound field. To compute LT60, the impulse response can be transformed from I(t) to $C(t)=10 \log_{10}(I^2(t))$. A least-squares line can be fit to C(t) and the RT60 can be computed as $t_{IR}=-60/s$, where s is the slope of the line. The impulse response (IR) can then be truncated to this length.

To compute the length of the early reflection phase, a peak density threshold of τ=500 peaks per second can be employed. The highest 100 to 200 amplitude peaks (registered by the peak detector component 402) in the impulse response can be selected, and a sliding window of a threshold time (e.g., ten milliseconds) can be employed to find the time (late reverberation onset time) when the number of peaks within such window falls below τ/100. This can yield the length of the early reflection phase in the impulse response ($t_{ER}$). All peaks in the truncated impulse response prior to the onset time of the late reverberation phase can be removed, and the resulting signal can be stored as the late reverberation phase for use at runtime. Again, this late reverberation signal can be utilized as an estimate for each impulse response at various source locations and/or receiver locations in the virtual three-dimensional environment 106. Of course, if computation time pertaining to execution of the numerical simulator 304 is not a concern, then an impulse response that includes both the early reflection phase and the late reverberation phase can be computed for each source location/receiver location pair simulated by the numerical simulator 304.

An example method for determining which locations in the virtual three-dimensional environment the numerical simulator 304 is to simulate as source locations will now be described. This method is provided to serve as an example, and is not intended to be limiting. For instance, the numerical simulator 304 can be configured to exhaustively simulate source/receiver locations in the virtual three-dimensional environment 106. In another example, subsampling can be employed to determine locations of sources utilized by the numerical simulator 304. In still yet another example, a random or pseudo-random function can be employed in connection with selecting sources for simulation.

The oracle simulation undertaken by the numerical simulator 304 can yield impulse responses (e.g., up to $t_{ER}$) over a subsampled grid in the virtual three-dimensional environment 106 when the source is at the centroid of the virtual three-dimensional environment 106. These impulse responses can be clustered using a similarity measure based on the early decay time or the time it takes for an impulse response to decay by 10 decibels. Early decay times can vary significantly within a room. A distance metric can be defined as $D(x_1, x_2) = \sqrt{\|x_1-x_2\|^2+(t_1-t_2)^2}$, and can be utilized to compute a distance (similarity) between two impulse responses at different receiver locations (x) with the respective decay times of the two impulse responses.

Clustering can then be undertaken, using a k-means algorithm, using D as a distance metric between points. The number of cluster points can be user-specified or automatically ascertained. Initial cluster centers can be distributed randomly in the virtual three-dimensional environment 106. After clustering converges, resulting centers can be stored as representative source locations, and can be utilized by the numerical simulator 304 in subsequent simulations. Additional simulations may then be undertaken by the numerical simulator 304, and compressed over locations in the virtual three-dimensional environment 106. The length of the subsequent simulations need only be for the length of the early reflection phase, as determined by the partitioner component 404 (since computed late reverberation impulse response can be used for all source/receiver pairs).

In summary, as described above, the numerical simulator 304 may be configured to perform an initial wave-based numeric simulation (e.g., simulating output of a pulse) which generates a response signal (impulse response), wherein the source and the receiver are at the same location (e.g., the center of the virtual three-dimensional environment 106). The peak detector component 402 can detect peaks in the response signal, and based at least in part upon the peaks detected in the response signal, the partitioner component 404 can determine a length of an early reflection phase of responses in the virtual three-dimensional environment 106. Therefore, in subsequent simulations the numerical simulator 304 can be configured to perform the simulation up until the end of the early reflection phase of response signals.

Subsequent to the oracle simulation being performed, particular source locations for subsequent simulations can be ascertained, and the numerical simulator 304 can be configured to perform simulations up until the end of the early reflection phase of response signals. In such subsequent simulations, for instance, a source location can be selected, and the numerical simulator 304 can compute response signals for sub-sampled cell locations in the virtual three-dimensional environment 106. For computed response signals, the peak detector component 402 can detect peaks in such response signals. For instance, the peak detector component 402 can collect a certain threshold number of highest amplitude peaks in a response signal, and cause such highest amplitude peaks to be retained in the data file 104 in the data repository 102. Such peaks can be determined by the peak detector component 402 for every computed response signal.

The encoder component 306 additionally includes a frequency trend determiner component 406 that estimates frequency trends for a particular source location/receiver location pair (for every response signal) based at least in part upon the peaks detected by the peak detector component 402 for a response signal. The frequency trend determiner component 406 can determine such a frequency trend by comparing the frequency response pertaining to the response signal computed during the simulation with the frequency response pertaining to the peaks extracted by the peak detector component 402 (e.g., the frequency response of a compressed impulse response). A transformer component 408 can execute a FFT to generate the frequency response of the simulation performed by the numerical simulator 304 and the frequency response pertaining solely to the peaks detected by the peak detector component 402. Substantial differences between such frequency responses can indicate the presence of low pass filtering due to diffraction.

The response signal of the extracted peaks I' can be constructed by summing over all peaks i with delays $t_i$ and amplitudes $a_i$:

$$I' = \Sigma_{i=1}^{N} a_i \delta(t - t_i),$$

where $\delta(t)$ is the analog of the signal input to the numerical simulator 304 (e.g., a Dirac-Delta function for the discrete case, a pulse of one sample width and unit amplitude). The corresponding frequency response can be denoted by $\hat{I}'$. Such signal can be compared to the frequency response of the uncompressed response signal prior to windowing, denoted $\hat{I}(f)$ below. This frequency response may include complete information for the early reflection portion of the response signal up to a threshold frequency (e.g., 1 kHz).

The (complex) amplitude at each frequency bin can be approximated as a product of the interference amplitude (captured by the peak locations and peak amplitudes) and the diffraction amplitude. The overall frequency-dependent diffraction trend can be obtained by way of the following:

$$T(f) = \left| \frac{\hat{I}(f)}{\hat{I}'(f)} \right|$$

for f≤the threshold (e.g., 1 kHz). T(f) may exhibit spikes due to instability in the division. Such spikes can be cleaned up with a median filter, using a bin width of 10 to 20 for an early reflection phase that is 100-200 milliseconds long. Also, the occurrence of these spikes can be reduced by perturbing the peak times at sub-millisecond resolution to find a substantially optimal fit between $\hat{I}(f)$ and $\hat{I}'(f)$. This can be followed by a Gaussian filter of similar width to obtain a smooth trend. The trend can then be normalized such that the trend starts with value 1 and bin 0.

Such trend can contain information related solely to diffraction. To detect if the overall trend is downward, a least-squares line can be fit to T(f). A non-negative slope indicates no significant diffraction. In such a case, no further processing need be performed, and the frequency filter for such pair need not be stored in the data file 104. Otherwise, the value for T(f) can be stored for each octave band (i.e., if frequency f=60, 125, 250, 500 and 1,000 Hertz).

As indicated above, a numerical simulation generated by the numerical simulator 304 may not include useful information above a threshold frequency (1 kHz). This is not a major limitation, because most perceivable diffraction effects are limited to 1 kHz in common acoustic spaces. Above such frequency, high frequency shadowing effect may desirably be captured. This can be undertaken by extrapolating the downward frequency trend, if present, in the mid-frequency range 250≤f≤1,000. A line fit can be performed on the power spectrum log T(f) over the mid-frequency range. This line can thereafter be used to extrapolate the value at 2, 4, 8, 16 and 22 kHz. Finally, the trend values for all octave bands with f=60, 125, 250, 500, 1000, 2000, 4000, 8000, 16,000, 22,000 Hertz can be stored for use at runtime.

In summary, the numerical simulator 304 and the encoder component 306 can operate in conjunction as follows: The numerical simulator 304 can be configured to execute the oracle simulation with a relatively long duration. In the oracle simulation, the source and receiver location can be identical. After the initial simulation is executed, the encoder component 306 can be configured to determine an early reflection and late reverberation phase of the response signal (e.g., determine when the late reverberation phase is onset)

and store a time that indicates the split between the early reflection and late reverberation phases. Optionally, the late reverberation phase pertaining to such oracle simulation can be retained and used as the late reverberation portion of each subsequently simulated response signal. The impulse response computed during the oracle simulation can also be utilized in connection with selecting source locations for subsequent simulation (up to the onset time of the late reverberation phase). The numerical simulator 304 may then be configured to perform simulations with each of the determined source locations, wherein duration of the simulation is for the aforementioned early reflection time period. The early reflection response periods for points on the subsampled volumetric grid can be compressed and stored with the source location, wherein the compressed early reflection response signal comprises extracted peaks and a frequency trend corresponding to such response signal. To further reduce precomputation time, it can be recognized that a response signal at a receiver location for a particular source location will also be the response signal if the source location and receiver location are switched.

Figure 5:
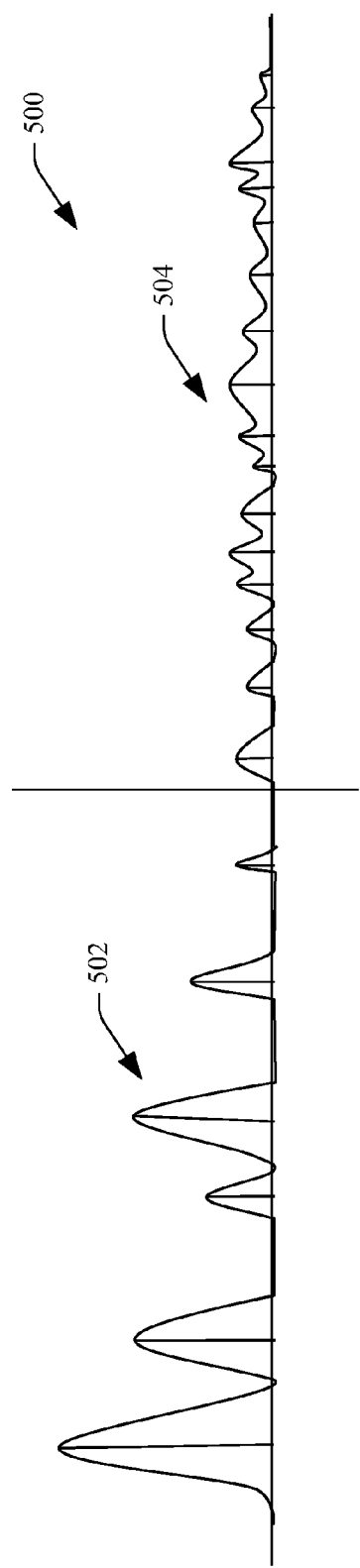
FIG. 5 illustrates a sample response signal that comprises an early reflection and late reverberation phase.

Referring now to FIG. 5, an example graphical depiction 500 of a response signal obtained during the initial simulation undertaken by the numerical simulator 304 is illustrated. The graphical depiction 500 shows that the response signal includes an early reflection phase 502 and a late reverberation phase 504. Additionally, the graphical depiction 500 displays the extraction of peaks from the early reflection phase 502 and the late reverberation phase 504.

Figure 6:
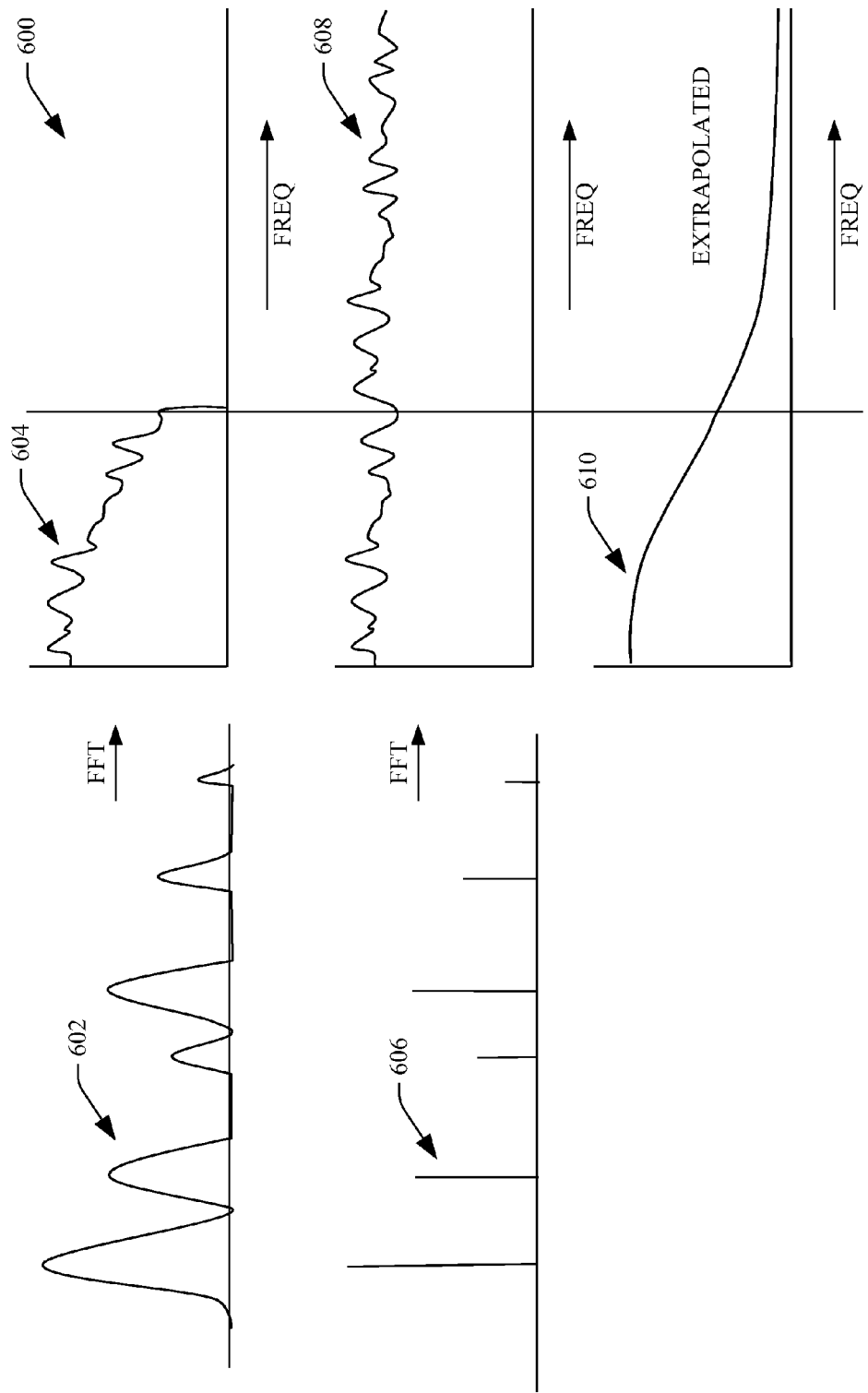
FIG. 6 is a graphical depiction of peaks extracted in an early reflection phase and a frequency trend that is based at least in part upon the extracted peaks.

Turning now to FIG. 6, an example graphical depiction 600 of peak detection and frequency trend determination is illustrated. The example depiction 600 comprises a first signal 602, which can be an early reflection portion of a response signal computed by the numerical simulator 304. A second signal 604 represents a FFT of the first signal 602, and is thus a frequency response for a particular source and receiver pair. A third signal 606 represents peaks extracted from the first signal 602, wherein such peaks indicate time and amplitude of local maxima in the first signal 602. A fourth signal 608 is a FFT of the third signal 606. It can be ascertained that the second signal 604 is associated with a particular cutoff frequency. It is desirable to obtain a frequency trend for frequencies above such cutoff frequencies. A fifth signal 610 represents a division of the second signal 604 by the fourth signal 608. Such division can indicate a frequency trend up to the threshold frequency, and a trend above such threshold frequency can be extrapolated as shown in FIG. 6. The combination of the third signal 606 and the frequency trend represented by the fifth signal 610 can be stored as representative of the first signal 602 (a compression of the response signal for the early reflection phase of the response signal).

Figure 7:
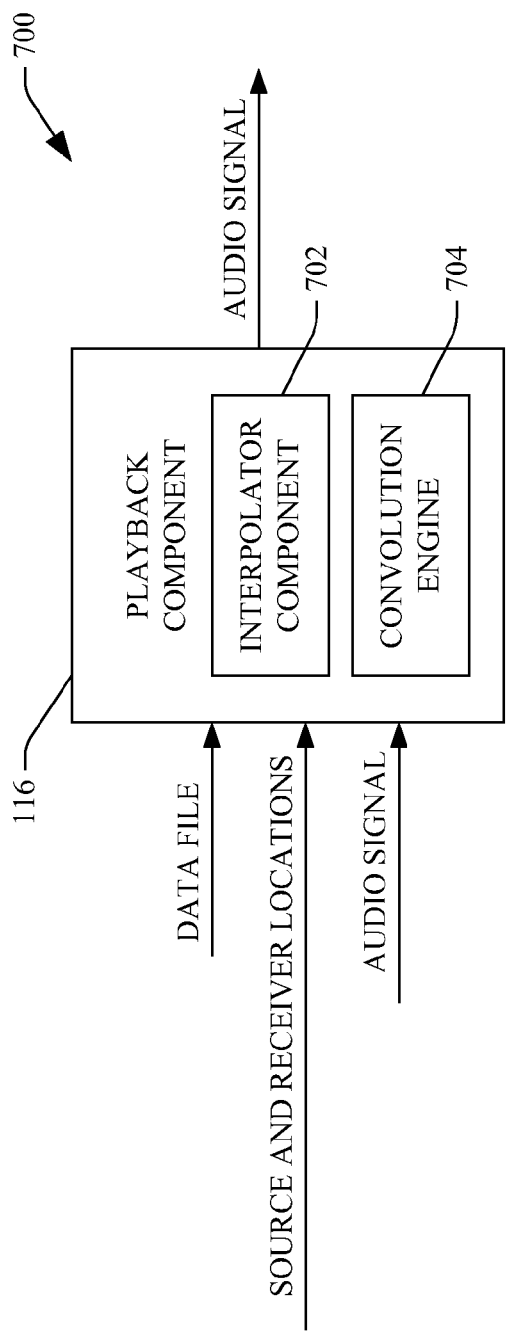
FIG. 7 is a functional block diagram of a playback component that automatically and in real time propagates audio for dynamic sources and/or dynamic receivers.

With reference now to FIG. 7, an example system 700 that facilitates real-time propagation of an arbitrary audio signal is illustrated. The system 700 comprises the playback component 116. The playback component 116 receives an arbitrary audio signal, a location of the source of the audio signal, and a location of the receiver of the audio signal in the virtual three-dimensional environment 106. Responsive to receipt of the source and receiver locations, the playback component 116 accesses the data file 104. A portion of the data file 104 accessed can be based upon source locations and receiver locations in the data file 104 that are proximate to the received source and receiver locations in the virtual three-dimensional environment 106. The playback component 116 can include an interpolator component 702 that can interpolate data between two or more portions of the data file 104. For instance, if the source location in the virtual three-dimensional environment 106 is between two source locations that were subject to simulation by the numerical simulator 304, the interpolator component 702 can access portions of the data file pertaining to the two known source locations and can interpolate such portions of the data file to accord to the received location in the virtual three-dimensional environment 106. This can also be undertaken for various receiver locations.

The playback component 116 can perform a FFT on the received audio signal and can perform a FFT on the interpolated data. A convolution engine 704 may then be configured to convolve the audio signal with the interpolated data. Performing computing operations on signals in the frequency domain allows for real-time modification of the audio signal. The resulting audio signal can be output via a speaker to a listener.

In more detail, as the audio signal is received, it can be placed in, for instance, two buffers. Once the audio signal is placed in the frequency domain, the audio signal in the two buffers can be convolved with the current interpolated response signal (as generated by the interpolator component 702). The audio in the second buffer can be retained and used in connection with interpolating a subsequent signal.

Figure 8:
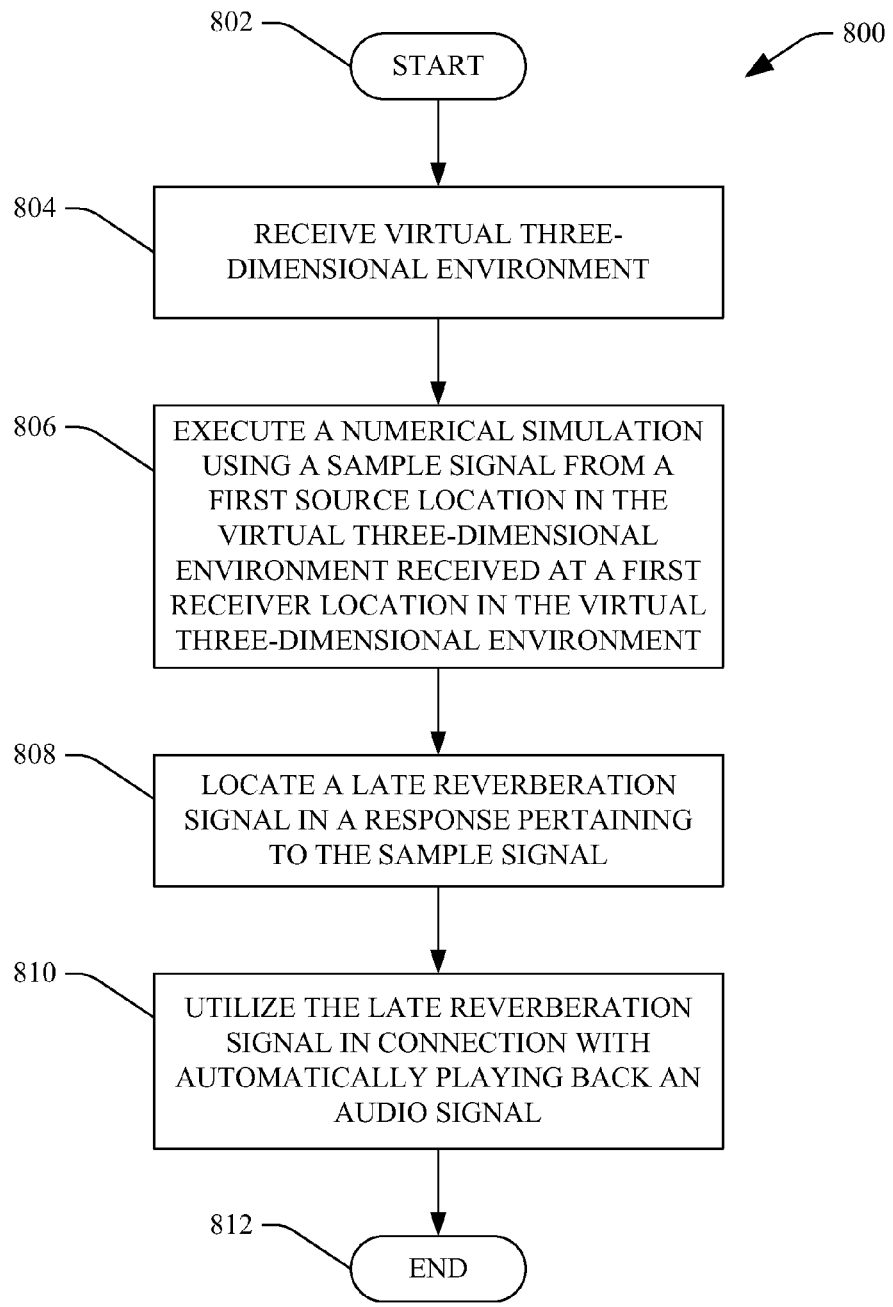
FIG. 8 is a flow diagram that illustrates an example methodology for automatically playing back an audio signal, based at least in part upon a late reverberation signal computed through utilization of a numerical simulator.
Figure 9:
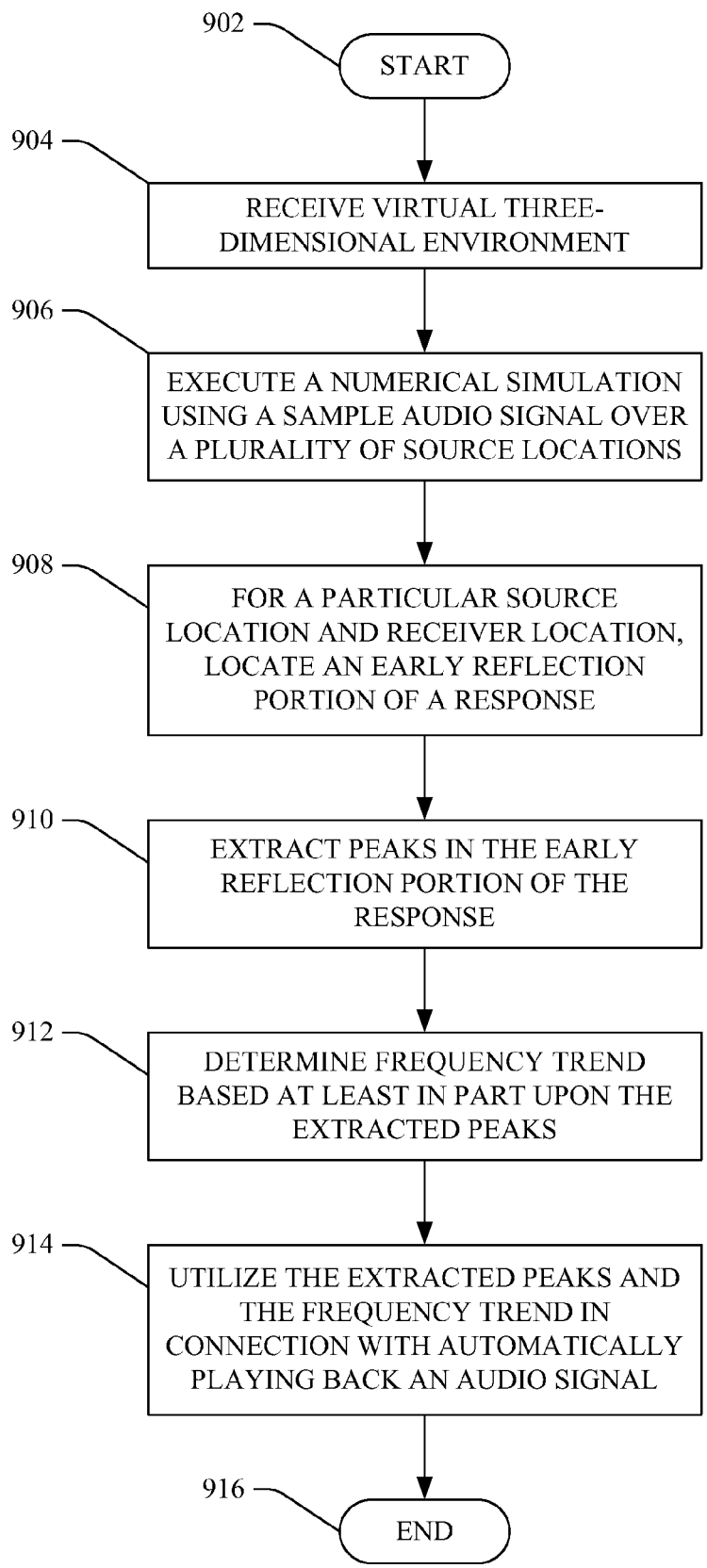
FIG. 9 is a flow diagram that illustrates an example methodology for extracting peaks and determining a frequency trend with respect to an early reflection portion of a response ascertained during a numerical simulation.
Figure 10:
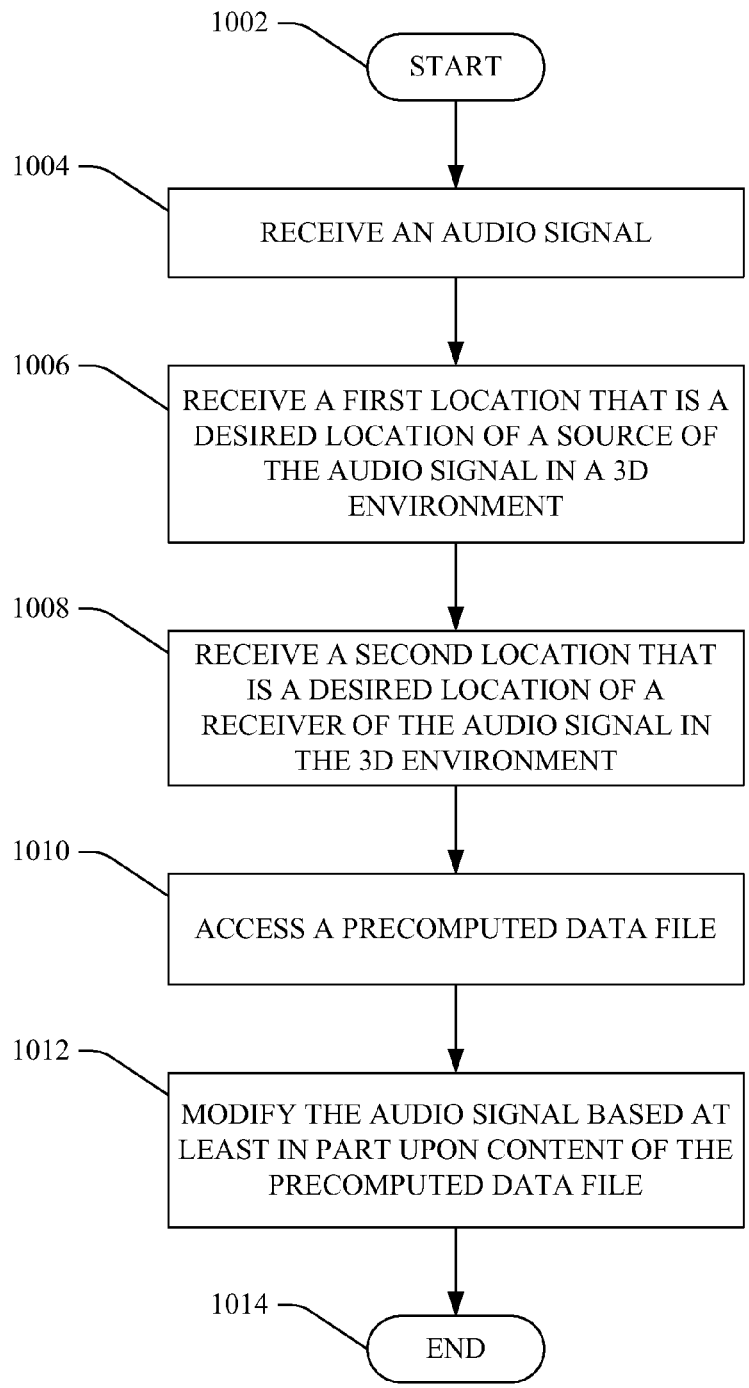
FIG. 10 is a flow diagram that illustrates an example methodology for automatically modifying an arbitrary audio-signal in real-time based at least in part upon a precomputed data file.

With reference now to FIGS. 8-10, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 8, a methodology 800 that facilitates automatically propagating an audio signal in real time in an environment with dynamic sources and/or receivers is illustrated. The methodology 800 begins at 802, and at 804 a virtual three-dimensional environment is received. The three-dimensional environment may include geometry pertaining to the environment, absorption parameters pertaining to the environment, amongst other data.

At 806 a numerical simulation is executed in the virtual three-dimensional environment, using a sample signal from a first source location in the virtual three-dimensional environment and received at a first receiver location in the virtual three-dimensional environment. In an example, the first source location and the first receiver location can be identical.

At 808, a late reverberation portion of a response signal is located, wherein such response pertains to the sample signal utilized by the numerical simulator. At 810 the late reverberation signal is utilized in connection with automatically playing back (propagating) an arbitrary audio signal, as has been described above. The methodology 800 completes at 812.

Now turning to FIG. 9, an example methodology 900 that facilitates utilizing extracted peaks in connection with automatically playing back an audio signal is illustrated. The methodology 900 starts at 902, and at 904 a virtual three dimensional environment is received. At 906, a numerical simulation is executed using a sample audio signal over a plurality of source locations and receiver locations.

At 908, for a particular source location and receiver location, an early reflection portion of a response is generated. At 910, peaks are extracted from the early reflection portion of the response signal.

At 912, a frequency trend is determined based at least in part upon the extracted peaks, and at 914 the extracted peaks are utilized with the frequency trend in connection with automatically playing back an audio signal (propagating the audio signal in real time, given moving sources/receivers). The methodology 900 completes at 914.

With reference now to FIG. 10, an example methodology 1000 that facilitates modifying audio in real-time through utilization of a pre-computed data file is illustrated. The methodology 1000 starts at 1002, and at 1004 an audio signal is received. At 1006, a first location is received, wherein the first location is a desired location of a source of the audio signal in a virtual three-dimensional environment.

At 1008, a second location is received, wherein the second location is a desired location of a receiver of the audio signal in the virtual three-dimensional environment. At 1010, a precomputed data file is accessed responsive to receipt of the first location and the second location, wherein the precomputed data file is based at least in part upon computed response signals with respect to a sample signal emitted from the source from a plurality of source locations and to a plurality of receiver locations in the three-dimensional environment. The methodology 1000 completes at 1012.

Figure 11:
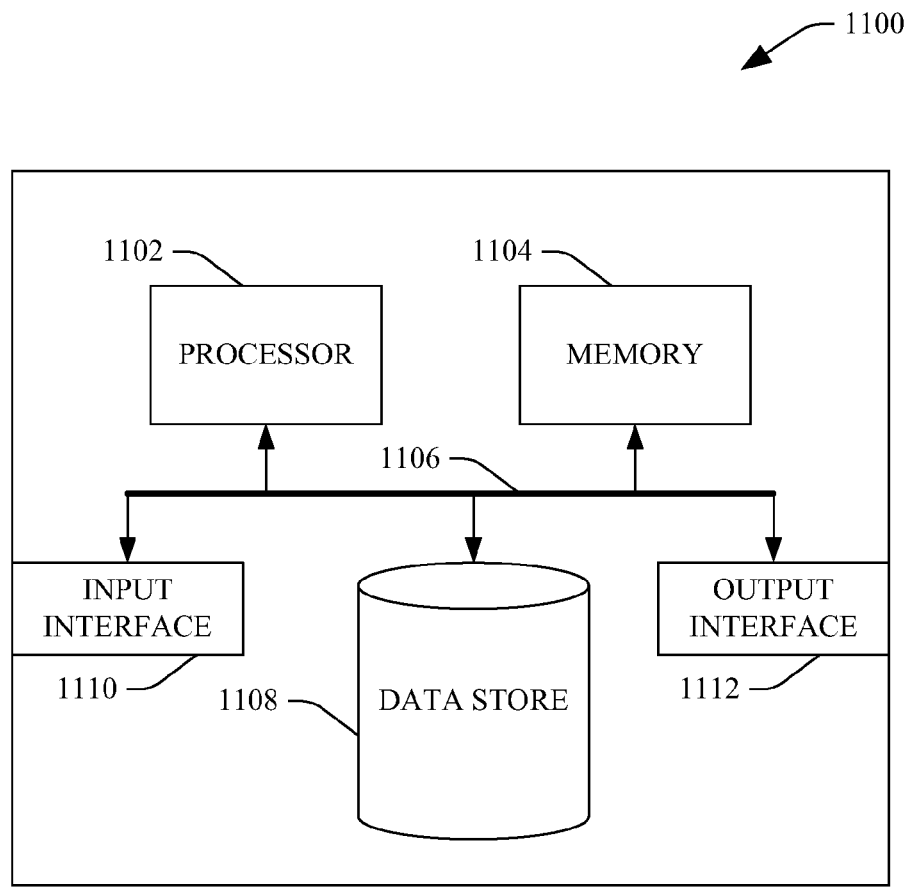
FIG. 11 is an example computing system.

Now referring to FIG. 11, a high-level illustration of an example computing device 1100 that can be used in accordance with the systems and methodologies disclosed herein is illustrated. For instance, the computing device 1100 may be used in a system that supports propagating a signal in real time, given moving sources/receivers in a virtual three-dimensional environment. In another example, at least a portion of the computing device 1100 may be used in a system that supports determining when for a particular environment an early reflection phase begins and a late reverberation phase begins in a response signal. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store a data file such as a data file generated by the generator component discussed above.

The computing device 1100 additionally includes a data store 1108 that is accessible by the processor 1102 by way of the system bus 1106. The data store 1108 may include executable instructions, a data file which includes compressions of response signals, etc. The computing device 1100 also includes an input interface 1110 that allows external devices to communicate with the computing device 1100. For instance, the input interface 1110 may be used to receive instructions from an external computer device, an audio signal from an interface device such as a microphone, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving an audio signal, the audio signal representative of a sound that is to originate from a source in a virtual three-dimensional (3D) environment;
   in real-time:
   determining that the source is at a source location in the virtual 3D environment, the source dynamically moveable in the virtual 3D environment;
   determining that a target for the sound in the virtual 3D environment is at a target location, the target dynamically moveable in the virtual 3D environment;
   responsive to determining that the source is at the source location and the target is at the target location, and based upon the source location and the target location, selecting a pre-computed compressed response signal from a plurality of pre-computed compressed response signals in a data file, the pre-computed compressed response signal comprises:
   a threshold number of peak amplitudes extracted from a frequency response signal generated during a simulation, the frequency response signal corresponds to the source being at the source location and the target being at the target location; and
   a frequency trend for the peak amplitudes modifying the audio signal using the pre-computed compressed response signal to generate a modified audio signal; and
   causing the modified audio signal to be output by way of a speaker to form a modification of the sound, wherein the modification of the sound is configured to audibly simulate the sound originating at the source location in the virtual 3D environment as the sound would be heard by the target at the target location in the virtual 3D environment.

2. The method of claim 1 configured to execute in a gaming console.

3. The method of claim 1, further comprising:
   in real time:
   determining that the target for the sound has moved from the target location to a second target location in the virtual 3D environment;

selecting a second pre-computed compressed response signal from the plurality of pre-computed compressed response signals, the second pre-computed compressed response signal selected based upon the second target location and the source location;

modifying the audio signal based upon the second pre-computed compressed response signal to generate a second modified signal; and causing the second modified audio signal to be output by way of the speaker to form a second modification of the sound, wherein the second modification of the sound is configured to simulate the sound originating at the source location in the virtual 3D environment as the sound would be heard by the target at the second target location.

4. The method of claim 1, further comprising generating the data file, wherein generating the data file comprises:

partitioning the virtual 3D environment into a plurality of 3D cells;

performing the simulation, wherein performing the simulation comprises:

simulating output of a sample sound from a source cell in the plurality of 3D cells;

simulating receipt of the sample sound at a plurality of target cells in the plurality of 3D cells; and computing a plurality of frequency response signals based upon the sample sound being output from the source cell and received at the plurality of 3D cells, the plurality of pre-computed compressed response signals based upon the plurality of frequency response signals.

5. The method of claim 4, wherein the simulating of the output of the sample sound and the simulating of the receipt of the sample sound is undertaken in a numerical simulation, the numerical simulation is a wave-based simulation.

6. The method of claim 1, wherein modifying the audio signal comprises:

storing at least a portion of the audio signal in a buffer;

appending a pre-computed late reverberation signal to an uncompressed response signal to generate an impulse response signal; and convolving the impulse response signal with the audio signal stored in the buffer.

7. The method of claim 1, further comprising generating the data file, wherein generating the data file comprises:

compressing frequency response signals generated during a numerical simulation executed with respect to the virtual 3D environment to generate the plurality of pre-computed compressed response signals.

8. The method of claim 7, further comprising compressing the frequency response signal for inclusion in the data file, wherein compressing the frequency response signal comprises extracting the peak amplitudes from the frequency response signal.

9. The method of claim 8, wherein compressing the frequency response signal further comprises computing the frequency trend based upon the peak amplitudes.

10. The method of claim 1 configured for execution in a sound studio or a teleconferencing application.

11. A system that facilitates simulating a sound in a virtual three-dimensional (3D) environment where location of a source of the sound and location of a receiver of the sound in the virtual 3D environment are dynamic, the system comprising:

at least one processor; and memory, the memory comprises:

a data file, wherein the data file comprises a plurality of pre-computed compressed response signals, each pre-computed compressed response signal in the plurality of pre-computed compressed response signals assigned to a respective source location-receiver location pair, a source location being a location of the source of the sound in the virtual 3D environment, a receiver location being a location of the receiver of the sound in the virtual 3D environment, the plurality of pre-computed compressed response signals generated based upon;

a simulation of a sample sound emitted in the virtual 3D environment from a plurality of different source locations and received at a plurality of different receiver locations, each pre-computed compressed response signal comprises:

a threshold number of peak amplitudes extracted from a response signal generated during the simulation; and a frequency trend for the peak amplitudes; and instructions that, when executed by the processor, cause the processor to perform acts comprising:

receiving an audio signal, the audio signal representative of the sound that is to be emitted by the source;

determining, in real-time, the source location and the receiver location;

retrieving a pre-computed compressed response signal from the data file that is assigned to the pair of the determined source location and the determined target location; and modifying the audio signal based upon the pre-computed compressed response to generate a modified sound, the modified sound configured to simulate the sound as the sound would be heard by the target at the target location when the sound originates from the source at the source location.

12. The system of claim 11 comprised by one of a gaming console, a music studio, a stereo system, a mobile computing device, a personal computing device, or a karaoke system.

13. The system of claim 11, the acts further comprising generating the data file, wherein generating the data file comprises utilizing a numerical simulator to generate the simulation of the sample audio signal.

14. The system of claim 13, wherein generating the data file further comprises:

receiving the virtual 3D environment, wherein the virtual 3D environment is partitioned into a 3D grid, and generating the data file based at least in part upon the 3D grid.

15. The system of claim 13, wherein generating the data file further comprises:

detecting a point in time that represents an end of an early reflection portion of a response signal and an onset of a late reverberation portion of the response signal;

generating a late reverberation signal based upon the end of the early reflection portion of the response signal and the onset of the late reverberation portion of the response signal; and including the late reverberation signal in the data file, the late reverberation signal indicated as being common across the plurality of different receiver locations.

16. The system of claim 13, the acts further comprising modifying the audio signal in real-time as one or more of the source or the receiver change location in the virtual 3D environment.

17. A computing device comprising a computer-readable memory, the computer-readable memory comprising instructions that, when executed by a processor, cause the processor to perform acts comprising:
  receiving an audio signal, the audio signal representative of a sound;
  receiving a location of a source of the sound in a virtual three-dimensional (3D) environment;
  receiving a location of a receiver of the sound in the virtual 3D environment, the location of the source and the location of the sound dynamically moveable in the virtual 3D environment;
  in response to receiving the location of the source and the location of the receiver, accessing a data repository that comprises a pre-computed data file, wherein the data file comprises a compressed response signal that corresponds to the location of the source and the location of the receiver, the compressed response signal comprises:
    a plurality of peak amplitudes extracted from a response signal generated during a simulation, the response signal corresponds to the location of the source and the location of the receiver; and
    a frequency trend that corresponds to the peak amplitudes;
  selecting the compressed response signal from the pre-computed data file based upon the location of the source and the location of the receiver; and
  modifying the received audio signal based upon the compressed response signal to, in real-time, simulate the sound as would be heard by the receiver at the received location of the receiver when the sound originates from the source at the received location of the source.

18. The computing device of claim 17 being a video game console.

19. The computing device of claim 17, the acts further comprising modifying the audio signal in real-time based upon other compressed response signals in the data file that correspond to other locations in the virtual 3D environment.

* * * * *